United States Patent Office 3,138,566
Patented June 23, 1964

3,138,566
FLUID RESINS PREPARED FROM EPOXIDIZED UNSATURATED FATTY ACIDS OR ESTERS
Heinz B. Arnold, Minneapolis, Minn., assignor to General Mills, Inc., a corporation of Delaware
No Drawing. Filed Jan. 8, 1960, Ser. No. 1,182
14 Claims. (Cl. 260—18)

This invention relates to the preparation of fluid resins by reacting epoxidized unsaturated fatty acids or esters with polyamines, and in particular to the preparation of such resins from the low oxirane oxygen content of epoxidized unsaturated fatty acids or esters.

It has been discovered that very fluid resins may be prepared from polyamines and epoxidized unsaturated higher fatty acids or esters having low oxirane oxygen content on the order of 1.0 to 3.0%. Such resins have a Brookfield vicosity range of from 5 to 110 poises at 25° C. These resins find utility in that they form very low viscosity systems, a rapid cure with epoxy resins, and chemical and solvent resistance of the cured products are very good. These resins will therefore find use in such areas as solvent and 100% solids coatings, laminates, concrete topping applications, tooling, potting, adhesives and sealants.

It is therefore an object of this invention to provide very fluid resins from the epoxidized unsaturated fatty acids or esters by reaction with polyamines.

It is also an object of this invention to provide for a very low viscosity system with such resins and epoxy resins.

It is further an object of this invention to provide a process for preparing such fluid resins.

Briefly the resins are prepared by reacting a polyamine with an epoxidized unsaturated fatty acid or ester having an oxirane oxygen content of from 1.0 to 3.0%. The reaction may be carried out at temperatures between 100 and 350° C., the preferred temperature range being 150 to 310° C. In the reaction the amine reacts with the acid or ester group to form an amide which can be converted to an imidazoline group and with the epoxy group to form a hydroxy amino derivative. This invention includes both the amino and imidazoline derivatives. At temperatures of about 150° amide formation is favored whereas at temperature above 200° C. imidazoline formation is favored. The resins prepared by the above method will have a Brookfield viscosity range of from 5 to 110 poises at 25° C. and an amine number of from 300 to 700. By amine number is intended the number of milligrams of potassium hydroxide equivalent to the free amine groups in one gram of resin.

The epoxidized higher fatty acid esters and fatty acids employed in this invention may be prepared by any of the known methods from any of the various unsaturated fatty acids. The fatty acids are a cheap and readily available natural raw material source. In nature they exist as complex mixtures of saturated and unsaturated fatty acids of varying chain lengths, frequently characterized as containing from 8 to 22 carbon atoms. In general the esters thereof which may be employed are the alkyl esters having from 1 to 5 carbon atoms. Preferably the lower alkyl esters having from 1 to 2 carbons atoms are used. The bulk of the unsaturated acids contain 18 carbon atoms with the exception of undecylenic acid which is prepared by the decomposition of ricinoleic acid. Illustrative sources of the unsaturated fatty acids are tall oil, soybean oil, linseed oil, cottonseed oil, rapeseed oil, fish oils and the like.

The epoxidized material may be prepared by any of the conventional well-known methods for epoxidation. One method of forming the epoxidized material is to react any of the various unsaturated fatty acids with peracetic acid at about room temperature. The peracetic acid may be performed before the epoxidation step or formed in situ by any one of the well known processes involving sulfonic acid resins utilizing hydrogen peroxide and acetic acid. Epoxidation can also be performed by the use of formic acid and hydrogen peroxide. The epoxidized materials may also be prepared by the addition of hydrochlorous acid to the carbon-carbon double bond followed by dehydrochlorination.

The epoxidized materials used in this invention have an oxirane oxygen content of from 1.0 to 3.0%. As the oxirane content nears 3%, a sharp increase in viscosity occurs. Accordingly for the very fluid resins having viscosities of less than 40 poises the preferred oxirane oxygen content is from 1.0 to 2.5%. The desired oxirane oxygen content can be realized by either direct epoxidation using the correct amount of epoxidizing material such as hydrogen peroxide to epoxidize the material only to the proper amount or by cutting back a high oxirane content material with unepoxidized fatty acid monomer to give the required oxirane oxygen content.

The polyamines which may be used are the polyalkylene polyamines which have the formula $H_2N(RNH)_xH$ where R is an alkylene radical having from 1 to 4 carbon atoms and $x$ is an integer from 2 to 5. The preferred polyamines which may be employed are those where R is ethylene and $x$ is an integer of 3 or 4, such as triethylene tetramine and tetraethylene pentamine. The ethylene type compounds are also preferred as the amide groups may be changed to imidazoline linkages. The polyamines may be used in a ratio of from 2.5 to 5.5 amine equivalents per total functional equivalent of the epoxidized unsaturated fatty acid material (the carboxyl plus epoxy), the preferred range being 2.8 to 5.0.

It is possible to carry out the reaction in several ways. One preferred method is to carry out the reaction at about 150° C. at which temperature the polyamino compound or compounds react to form primarily amide linkages with only little imidazoline formation, the amide linkages being favored at this temperature. At temperatures in excess of 200° C. the formation of imidazoline linkages increases and at about 300° C. the material contains mainly imidazoline linkages. Temperatures much in excess of 300° C. are in general to be avoided as deleterious side effects may occur at such temperatures. The reaction is generally carried out for 2 to 3 hours. Extended reaction times in excess of 5 hours do not appear to have additional effect. In general the reaction will not be complete in less than 1 hour.

The invention can best be illustrated by means of the following examples in which the equivalents of epoxidized material refer to total functional equivalents (epoxy plus carboxyl) after diluting with unepoxidized material where the low oxirane oxygen content is so obtained.

EXAMPLE I

A mixture of 3.9 equivalents of triethylene tetramine and one equivalent of the methyl esters of tall oil fatty acids having a 2.5% oxirane oxygen content (prepared directly by epoxidation) is heated with stirring at 300° C. for 2 hours. The alcohol formed is allowed to distill off. The product has an amine value of 433 and a Brookfield viscosity of 17.5 poises at 25° C.

EXAMPLE II

A mixture of 3.9 equivalents of triethylene tetramine and one equivalent of the epoxidized methyl esters of tall oil fatty acids having a 2.5% oxirane oxygen content is heated with stirring at 300° C. for 2 hours. The oxirane content was obtained by diluting the epoxidized methyl esters of tall oil fatty acids having an oxirane content of 5.28% with unepoxidized tall oil fatty acid methyl esters. The alcohol formed is allowed to distill off. The product has an amine value of 447 and a Brookfield viscosity of 12.5 poises at 25° C.

EXAMPLE III

A mixture of 3.9 equivalents of triethylene tetramine and one equivalent of the epoxidized methyl esters of tall oil fatty acids having a 2.03% oxirane oxygen content is reacted as in Example II. The oxirane content was obtained by diluting the epoxidized methyl esters of tall oil fatty acids having an oxirane content of 5.28% with unepoxidized tall oil faty acid methyl esters. The product has an amine value of 424 and a Brookfield viscosity of 12 poises at 25° C.

EXAMPLE IV

A mixture of 3.6 equivalents of triethylene tetramine and one equivalent of the epoxidized methyl esters of tall oil fatty acids having a 2.0% oxirane oxygen content is reacted as in Example II. The oxirane content was obtained by diluting the epoxidized methyl esters of tall oil fatty acids having an oxirane content of 5.28% with unepoxidized tall oil fatty acid methyl esters. The product has an amine value of 388 and a Brookfield viscosity of 12.8 poises at 25° C.

EXAMPLE V

A mixture of 3.2 equivalents of triethylene tetramine and one equivalent of the epoxidized methyl esters of tall oil fatty acids having a 2.0% oxirane oxygen content is reacted as in Example II. The oxirane content was obtained by diluting the epoxidized methyl esters of tall oil fatty acids having an oxirane content of 5.28% with unepoxidized tall oil fatty acid methyl esters. The product has an amine value of 344 and a Brookfield viscosity of 16.2 poises at 25° C.

EXAMPLE VI

A mixture of 2.8 equivalents of triethylene tetramine and one equivalent of the epoxidized methyl esters of tall oil fatty acids having a 2.0% oxirane oxygen content is reacted as in Example II. The oxirane content was obtained by diluting the epoxidized methyl esters of tall oil fatty acids having an oxirane content of 5.28% with unepoxidized tall oil fatty acid methyl esters. The product has an amine value of 306 and a Brookfield viscosity of 30.6 poises at 25° C.

EXAMPLE VII

A mixture of 3.9 equivalents of triethylene tetramine and one equivalent of the epoxidized methyl esters of tall oil fatty acids having a 1.5% oxirane oxygen content is reacted as in Example II. The oxirane content was obtained by diluting the epoxidized methyl esters of tall oil fatty acids having an oxirane content of 5.28% with unepoxidized tall oil fatty acid methyl esters. The product has an amine value of 399 and a Brookfield viscosity of 7.5 poises at 25° C.

Example VIII

A mixture of 3.9 equivalents of triethylene tetramine and one equivalent of the epoxidized methyl esters of tall oil faty acids having a 1.1% oxirane oxygen content is reacted as in Example II. The oxirane content was obtained by diluting the epoxidized methyl esters of tall oil fatty acids having an oxirane content of 5.28% with unepoxidized tall oil fatty acid methyl esters. The product has an amine value of 365 and a Brookfield viscosity of 6.2 poises at 25° C.

EXAMPLE IX

A mixture of 4.0 equivalents of triethylene tetramine and 1.0 equivalent of the epoxidized methyl esters of tall oil fatty acids having a 1.96% oxirane oxygen content is reacted at about 150° C. for 2 hours followed by vacuum stripping (20–25 in. Hg) at 150° C. for one hour. The oxirane content was obtained by diluting the epoxidized methyl esters of tall oil fatty acids having an oxirane content of 5.28% with unepoxidized tall oil fatty acid methyl esters. The alcohol formed is allowed to distill off. The product has an amine value of 511 and a Brookfield viscosity of 18.5 poises at 25° C.

EXAMPLE X

A mixture of 3.2 equivalents of triethylene tetramine and one equivalent of the epoxidized methyl esters of tall oil fatty acids having a 1.95% oxirane oxygen content is reacted as in Example IX. The oxirane content was obtained by diluting the epoxidized methyl esters of tall oil fatty acids having an oxirane content of 5.28% with unepoxidized tall oil fatty acid methyl esters. The product has an amine value of 346 and a Brookfield viscosity of 32 poises at 25° C.

EXAMPLE XI

A mixture of 2.84 equivalents of triethylene tetramine and one equivalent of the epoxidized methyl esters of tall oil fatty acids having a 1.89% oxirane oxygen content is reacted as in Example IX. The oxirane content was obtained by diluting the epoxidized methyl esters of tall oil fatty acids having an oxirane content of 5.28% with unepoxidized tall oil fatty acid methyl esters. The product has an amine value of 392 and a Brookfield viscosity of 37.5 poises at 25° C.

EXAMPLE XII

A mixture of 5.0 equivalents of tetraethylene pentamine and one equivalent of the epoxidized methyl esters of tall oil fatty acids having a 2.5% oxirane oxygen content (prepared directly by epoxidation) is reacted as in Example IX. The product has an amine value of 637 and a Brookfield viscosity of 36.8 poises at 25° C.

EXAMPLE XIII

A mixture of 5.0 equivalents of tetraethylene pentamine and one equivalent of the epoxidized methyl esters of tall oil fatty acids having a 1.96% oxirane oxygen content is reacted as in Example IX. The oxirane content was obtained by diluting the epoxidized methyl esters of tall oil fatty acids having an oxirane oxygen content of 5.28% with unepoxidized methyl esters of tall oil fatty acids. The product has an amine value of 596 and a Brookfield viscosity of 18 poises at 25° C.

EXAMPLE XIV 5.0 equivalents of tetraethylene pentamine and one equivalent of the epoxidized methyl esters of soybean oil fatty acids having an oxirane oxygen content of 6.52% diluted with unepoxidized tall oil fatty acids to 2.08% oxirane oxygen content is reacted as in Example IX. The product has an amine value of 597 and a Brookfield viscosity of 19 poises at 25° C.

EXAMPLE XV 5.0 equivalents of tetraethylene pentamine and one equivalent of the epoxidized methyl esters of soybean oil fatty acids having an oxirane oxygen content of 6.52% diluted with unepoxidized methyl esters of soybean oil fatty acids to 2.10% oxirane oxygen content is reacted as in Example IX. The product has an amine value of 603 and a Brookfield viscosity of 13.8 poises at 25° C.

EXAMPLE XVI 14 lbs. (3.4 equivalents) of triethylene tetramine and 23 lbs. (one equivalent) of the epoxidized methyl esters of tall oil fatty acids having a 1.96% oxirane oxygen content were reacted as in Example II. The oxirane content was obtained by diluting the epoxidized methyl esters of tall oil fatty acids having an oxirane oxygen content of 5.28% with unepoxidized methyl esters of tall oil fatty acids. The product has an amine value of 416 and a Brookfield viscosity of 14–15 poises at 25° C.

EXAMPLE XVII 17 lbs. (4.0 equivalents) of triethylene tetramine and 24 lbs. (one equivalent) of the epoxidized methyl esters of tall oil fatty acids having a 1.97% oxirane oxygen content were reacted as in Example IX. The oxirane content was obtained by diluting the epoxidized methyl esters of tall oil fatty acids having an oxirane oxygen content of 5.28% with unepoxidized methyl esters of tall oil fatty acids. The product has an amine value of 517 and a Brookfield viscosity of 10.6 poises at 25° C.

EXAMPLE XVIII 20 lbs. (5.0 equivalents) of tetraethylene pentamine and 20.7 lbs. (one equivalent) of the epoxidized methyl esters of tall oil fatty acids having a 2.0% oxirane oxygen content were reacted as in Example IX. The oxirane content was obtained by diluting the epoxidized methyl esters of tall oil fatty acids having an oxirane oxygen content of 4.7% with unepoxidized methyl esters of tall oil fatty acids. The product has an amine value of 600 and a Brookfield viscosity of 21 poises at 25° C.

EXAMPLE XIX 3.9 equivalents of tetraethylene pentamine and one equivalent of the epoxidized methyl esters of tall oil fatty acids having a 3.06% oxirane oxygen content were reacted as in Example IX. The oxirane content was achieved by diluting the epoxidized methyl esters of tall oil fatty acids having an oxirane oxygen content of 5.28% with unepoxidized methyl esters of tall oil fatty acids. The product has an amine value of 546 and a Brookfield viscosity of 108 poises at 25° C.

From the above examples it can be seen that essentially the same product is obtained even though the desired oxirane content is obtained by different means, i.e., direct epoxidation versus dilution (compare Examples I and II). Furthermore, essentially the same product is obtained even though different epoxidized unsaturated fatty acids or esters are used as starting materials. Thus in Example XVIII the epoxidized methyl esters of tall oil acids diluted with methyl esters of tall oil acids to an oxirane content of 2.0% are reacted with tetraethylene pentamine, and in Example XV the epoxidized methyl esters of soybean acids diluted with the soybean acid methyl esters to an oxirane content of 2.10% are reacted with tetraethylene pentamine. The viscosity and amine value of the resulting resins are essentially the same and the physical properties of the thermosets obtained when these two resins are reacted with epoxy are very similar as will be seen later.

Then, too, the high oxirane content fatty acid or ester need not be diluted to the desired oxirane content with the same fatty acid as that originally epoxidized. In Example XIII, tall oil fatty acid methyl ester epoxidized to an oxirane content of 5.28% were diluted to an oxirane content of 1.96% with tall oil fatty acid methyl esters. In Example XIV, soybean acid methyl esters epoxidized to an oxirane content of 6.52% were diluted to an oxirane content of 2.08% with tall oil fatty acids. In spite of this difference in the starting materials the resulting resins described in Examples XIII and XIV possess almost identical amine value and viscosity. Also the thermosets obtained from these two resins with epoxy resins have essentially the same physical strength properties. Finally, if the oxirane content of the epoxidized fatty material is held constant and the equivalents of the polyamine used is decreased the product amine value gradually decreases and viscosity increases (Examples III through VI). Scale-up presents no difficulties and resin properties (amine value and viscosity) are similar to those obtained on laboratory batches. Examples XVI, XVII and XVIII represent scale-ups of Examples IV, IX and XIII respectively.

As indicated above, these resins can be reacted with epoxy resins to form a thermosetting material. The final cured product possesses good heat resistance, hardness and flexural strength. The epoxy resins which may be employed are complex polymeric reaction products of polyhydric, mono- and polynuclear phenols with polyfunctional halohydrins and/or glycerol dichlorohydrin. A large number of epoxy resins of this type are disclosed in Greenlee Patents 2,585,115 and 2,589,245. In addition several of these resins are readily available commercial products. Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis(p-hydroxy phenyl) propane (Bisphenol A), the resin having the following theoretical structural formula

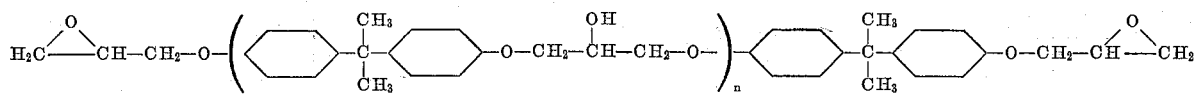

where $n$ is 0 or an integer up to 10. Generally speaking, $n$ will be no greater than 2 or 3 and is preferably 1 or less.

Epoxy resins may be characterized further by reference to their epoxy equivalent weight, the epoxy equivalent weight of pure epoxy resins being the molecular weight of the resin divided by the mean number of epoxy radicals per molecule or in any case the number of grams of one gram equivalent of epoxide. While certain specific epoxy resins which are the most readily available have been described, it is understood that the epoxy resinous compositions encompassed by this invention are those epoxy resins having an epoxy equivalent weight of 140 to 1000, the preferred epoxy equivalent weight being 170 to 600, expressed in terms of grams of compound per epoxy group.

The reaction of the resins with the epoxy resins can best be illustrated by means of the following example set forth in tabular form. The ratios given are those which produce optimum flexural deformation temperatures. In Table I all the specimens were cured at 300° F. for 2 hours and for convenience a commercially available epoxy resin was used which was a condensation product of Bisphenol A and epichlorohydrin having a viscosity of 100–250 centipoises and an epoxy equivalent weight of 180–210.

Table I
PROPERTIES OF CURED RESIN BLENDS

| Resin of Example No. | Ratio With Epoxy Resin | FDT, °C.[1] | Barcol Hardness [2] | Flexural Ultimate,[3] p.s.i. |
|---|---|---|---|---|
| 1 | 20/80 | 103 | 70 | 12,700 |
| 2 | 20/80 | 100 | 69 | 14,600 |
| 3 | 20/80 | 97 | 68 | 11,600 |
| 4 | 20/80 | 99 | 66–69 | 17,000 |
| 5 | 20/80 | 93 | 68–69 | 11,700 |
| 6 | 25/75 | 87 | 66–68 | 17,000 |
| 7 | 20/80 | 90 | 68 | 12,300 |
| 8 | 20/80 | 89 | 69 | 14,400 |
| 9 | 30/70 | 78 | 67–70 | 12,100 |
| 10 | 35/65 | 68.5 | 60–61 | 14,700 |
| 11 | 35/65 | 74 | 62–63 | 14,300 |
| 12 | 25/75 | 97 | 69–70 | |
| 13 | 30/70 | 86 | 66–68 | |
| 14 | 30/70 | 87 | 68–73 | 15,400 |
| 15 | 30/70 | 82 | 65–68 | 16,100 |
| 16 | 25/75 | 88 | 66–70 | |
| 18 | 30/70 | 85 | 68–71 | 14,400 |
| 19 | 30/70 | 85 | 68–71 | |

[1] ASTM D648, 264 p.s.i.
[2] Barcol Impressor Model GYZJ-935.
[3] ASTM D790-49T.

Blends of the resins of this invention with epoxies are capable of curing at ambient temperatures to hard, impact resistance thermoset compositions or they may be cured by the application of heat. The rate of cure at ambient temperatures is demonstrated in Table II, which presents data obtained on ½ gallon pot life studies. The ingredients were allowed to equilibriate at 25° C. overnight and then blended in the ratios indicated. The resin of Example XVI is representative of the imidazoline type and the resin of Example XVIII is a typical aminoamide type. For the sake of brevity the data is restricted to these two resins in any further data presented and the resin of Example XVI will be referred to as resin P, while the resin of Example XVIII will be referred to as resin R. The epoxy resin used in the following data is the same as that used for Table I, except where otherwise noted.

*Table II*

½ GALLON POT LIFE DATA

| Composition | Ratio | Pot Life, min. | Temp. At Gelation | | Exotherm | |
|---|---|---|---|---|---|---|
| | | | ° C. | ° F. | ° C. | ° F. |
| Resin P/Epoxy | | | | | | |
| Resin | 25:75 | 65 | 86 | 187 | 233 | 452 |
| Do | 30:70 | 55 | 80 | 176 | 231 | 448 |
| Do | 25:75 | 50 | 86 | 187 | 238 | 460 |
| Do | 30:70 | 42 | 87 | 189 | 231 | 448 |
| Resin R/Epoxy | | | | | | |
| Resin | 30:70 | 20 | 80 | 176 | 218 | 424 |
| Do | 30:70 | 21 | 76 | 169 | 222 | 432 |

Additional pot life data (200 gm. batches) are presented in Table III. The rate of cure was followed by determining hardness of the blends at the times indicated.

*Table III*

ROOM TEMPERATURE CURING: BARCOL HARDNESS OF BLENDS WITH EPOXY RESIN (200 GM. QUANTITIES)

| Elapsed Time | Resin R/Epoxy 30/70 | Resin P/Epoxy 25/75 |
|---|---|---|
| 50 min | [1] 90–95 | |
| 100 min | 63–66 | |
| 2 hrs | 67–68 | |
| 3 hrs | 68–72 | |
| 5 hrs | 67–72 | [1] 25–30 |
| 6 hrs | 68–72 | [1] 80–85 |
| 20 hrs | | 10–15 |
| 30 hrs | 69–72 | 15–20 |
| 48 hrs | | |
| 72 hrs | | |
| 100 hrs | | 50–60 |
| 200 hrs | | 50–60 |

[1] Shore Durometer A.

The excellent physical strength properties of these resins in combination with epoxies is evident in Table IV. All specimens used in obtaining these data were machined from the ½ gallon pot life samples.

*Table IV*

PHYSICAL STRENGTH PROPERTIES

| Composition | Ratio | Compressive Yield, p.s.i.[1] | Tensile Ultimate, p.s.i.[2] | Flexural Ultimate, p.s.i.[2] | Flexural Modulus p.s.i.[3] | Mechanical Shock lbs.[4] |
|---|---|---|---|---|---|---|
| Resin P/Epoxy | 25/75 | 13,200 | 9,800 | 13,000 | 3.13×10⁵ | 9.43 |
| Resin R/Epoxy | 30/70 | 13,000 | 11,200 | 14,100 | 3.46×10⁵ | 6.32 |

[1] ASTM D695 5-52T.
[2] ASTM D638-52T.
[3] ASTM D790-49T.
[4] Wt. of steel ball causing failure.

The excellent thermal shock resistance of these resins is illustrated in Table V. The test is run essentially as described in U.S. Patent 2,681,901. A one-half inch steel cube is suspended in the approximate center of a cone of the resin-epoxy blend (2.5 inch diameter base, 3.5 inch height). The mass is cured at 300° F. for two hours. The specimen is then subjected to the following temperature cycles:

Three cycles from Dry Ice temperature (−70° C.) to room temperature.
Two cycles from 100° C. to room temperature.
Two cycles from 150° C. to room temperature.
Two cycles from 200° C. to room temperature.

Each cycle covers three hours, two hours at the designated temperature and one hour at room temperature.

The specimen is examined after each cycle for cracks and other evidence of failure.

*Table V*

RESULTS OF STEEL CUBE THERMAL SHOCK TESTS

| Composition | Ratio | Results |
|---|---|---|
| Resin P/Epoxy | 25/75 | Passed all cycles. |
| Resin R/Epoxy | 30/70 | Do. |

Not only can hard rigid thermoset be prepared but also soft, flexible cured systems which should find use as sealants. This property is well demonstrated in Table VI.

*Table VI*

COMPARISON OF SOFT, FLEXIBLE FORMULATIONS
(Barcol Hardness)

| Resin Epoxy Ratio | Resin P | Resin R |
|---|---|---|
| 30/70 | 70–73 | 66–68 |
| 35/65 | 65–69 | 66–68 |
| 40/60 | 63–66 | 62–64 |
| 50/50 | 51–54 | 47–53 |
| 60/40 | 5–10 | [1] 90–95 |
| 65/35 | [1] 85–90 | [1] 60–65 |
| 70/30 | [1] 40–45 | [1] 5 |

[1] Shore Durometer A.

Data on linear shrinkage is presented in Table VII. The extremely low shrinkage of these resins in combination with epoxies is a property of value in such application as tooling, potting, etc.

*Table VII*

LINEAR SHRINKAGE DURING CURE USING AN OPEN TOP MOLD
(Inches Per Inch)

| Ratio With Epoxy Resin | Resin P[1] | Resin R[2] |
|---|---|---|
| 30/70 | 0.0145 | 0.0046 |
| 25/75 | 0.0148 | |
| 30/70 | 0.0141 | 0.0032 |
| 25/75 | 0.0141 | |

[1] System cured 2 hrs. at 300° F.
[2] System cured 2 hrs. at 150° F.

A typical application of the resins of this invention is the preparation of laminates. The physical strength data of such laminates are presented in Table VIII. These laminates (6 ply) were prepared using fiberglass cloth (0.060″) in matched metal die molds. They were pressure cured for 10 minutes at 300° F. The high strength obtainable with room temperature cure is demonstrated by the preparation of a hand lay-up laminate.

*Table VIII*

LAMINATE STRENGTH—6 PLY

| Composition | Resin Ratio | Resin/Glass Ratios | Flexural Ultimate, p.s.i. | Flex. Ult. After 2 Hrs. in Boiling Water, p.s.i. | Flex. Modulus, p.s.i. | Barcol Hardness |
|---|---|---|---|---|---|---|
| Resin P/Epoxy | 25/75 | 35/65 | 61,400 | 40,350 | 2.68×10⁶ | 85–90 |
| Resin R/Epoxy | 30/70 | 35/65 | 57,600 | 42,800 | 2.66×10⁶ | 85–90 |
| Resin R/Epoxy[1] | 30/70 | 39/61 | 59,500 | 42,350 | 2.11×10⁶ | 85–90 |

[1] Hand lay-up laminate cured at ambient temperature overnight (16 hrs.).

A further application in which the resins of this invention were tested is that of coatings. Data on solvent coatings are given in Table IX. The coatings listed were applied at 50% nonvolatile content on tin or glass plates. The solvents which may be employed are the conventional epoxy resin and polyamide resin solvents.

Table IX

| Resin | Resin/Epoxy Solids Ratio | Tack Free Time, 70-77° F., min. | Impact Resistance—Room Temp. Dry | | | | | Sward Hardness—Room Temp. Dry | | |
|---|---|---|---|---|---|---|---|---|---|---|
| | | | Baked 10 min., 300° F. | 1 Day | 2 Days | 3 Days | 6-9 Days | Baked | 1 Day | 9 Days |
| P | 40/60 | 250 | 60+ | 2- | 2- | 2- | 2- | 72 | ¹26 | ¹30 |
| P | 35/65 | 195 | 60+ | 2- | 2- | 16-30 | 60+ | 78 | 36 | 56 |
| P | 30/70 | 195 | 60+ | 2- | 2- | 60+ | | 78 | 42 | 60 |
| R | 25/75 | 215 | 60+ | 60+ | | | | 70 | 44 | 50 |
| R | 20/80 | 215 | 60+ | 60+ | | | | 82 | 38 | 60 |
| R | 15/85 | 210 | 60+ | 60+ | 60+ | | | 89 | 36 | 58 |

*Condensation product of bisphenol A and epichlorohydrin having melting point of 70-75° C. and epoxy equivalent value near 500.
¹ Rough film.
NOTE: The resins of this invention were dissolved in xylene and 2, ethoxy ethanol-1 (60% nonvolatile) and the epoxy resin was dissolved in xylene and methyl isobutyl ketone (60% nonvolatile). The two solutions were then blended in the ratios indicated and diluted to 50% nonvolatile content with 9:1 ratio of xylene to 2, ethoxy ethanol-1.

It is apparent that satisfactory coatings can be prepared using the resins of the present invention using from 15 to 40 parts by weight of the resin and 85-60 parts by weight of epoxy resin. The preferred range would be 20 to 30 parts resin to 80 to 70 parts epoxy resin.

The resins of this invention, particularly the aminoamide types, offer very definite advantages in concrete topping formulations. A typical self-leveling concrete topping formulation is given in Table X. Such a topping has the advantage of very good moisture, solvent and chemical resistance. It forms an extremely strong bond to concrete and will cure overnight.

Table X
TYPICAL CONCRETE TOPPING FORMULATION 30 pts. by wt. resin R.
70 pts. by wt. liquid epoxy resin (epoxy equivalent weight about 190).
400-600 pts. by wt. 30-70 mesh sand.

While only one specific composition using resin R is illustrated, any of the fluid resins of this invention may be used with the epoxy resins to form suitable concrete toppings. Any fluid epoxy resin is suitable. Fluid epoxy resins generally have an epoxy equivalent weight of about 150 to about 400, the preferred resins being those having an epoxy equivalent weight of about 120 to 300. In general, suitable formulations can be prepared using proportions of the materials falling within the ranges listed below:

20-25 parts by weight of the resins of the present invention (amine number 300 to 700).
80-65 parts by weight epoxy resin (epoxy equivalent weight 170 to 400).
400-600 parts by weight of filler.

Other fillers in addition to sand may be used. Illustrative of such fillers are gravel, clay, marble or granite chips, quartzite and the like.

The embodiments of the invention in which an exclusive property or privilege is claimed are defined as follows:

1. A resinous composition comprising the reaction product at a temperature of from about 100 to about 350° C. of an epoxidized compound having an oxirane oxygen content of from 1.0 to 3.0%, said epoxidized compound being selected from the group consisting of the epoxidized higher fatty acids and the alkyl esters thereof, the alkyl group having from 1 to 5 carbon atoms and a polyamine having the formula $H_2N(RNH)_xH$, where R is an alkylene radical having from 1 to 4 carbon atoms and $x$ is an integer from 2 to 5 said polyamine being employed in an amount of from 2.5 to 5.5 amine equivalents per total functional equivalent of said epoxidized compound.

2. A composition as defined in claim 1 in which R is ethylene.

3. A composition as defined in claim 1 having a Brookfield viscosity of from 5 to 110 poises at 25° C.

4. A composition as defined in claim 1 having a Brookfield viscosity of from 5 to 40 poises at 25° C.

5. A composition as defined in claim 1 having an amine number of from 300 to 700.

6. A cured composition of matter comprising the reaction product of (A) an epoxy resin of a polyhydric phenol and a polyfunctional halohydrin having an epoxy equivalent weight of from 140 to 1000 and (B) a fluid resin of (a) an epoxidized compound having an oxirane oxygen content of from 1.0 to 3.0%, said epoxidized compound being selected from the group consisting of the epoxidized higher fatty acids and the alkyl esters thereof, the alkyl group having from 1 to 5 carbon atoms and (b) a polyamine having the formula $H_2N(RNH)_xH$, where R is an alkylene radical having from 1 to 4 carbon atoms and $x$ is an integer from 2 to 5 said polyamine being employed in an amount of from 2.5 to 5.5 amine equivalents per total functional equivalent of said epoxidized compound.

7. A composition as defined in claim 6 in which R is ethylene.

8. A composition as defined in claim 6 in which said fluid resin has a Brookfield viscosity of from 5 to 110 poises at 25° C.

9. A composition as defined in claim 6 in which said fluid resin has a Brookfield viscosity of from 5 to 40 poises at 25° C.

10. A composition as defined in claim 6 in which said fluid resin has an amine number of from 300 to 700.

11. A composition as defined in claim 6 in which said epoxy resin is employed in an amount of from 60 to 80 parts by weight and said fluid resin is employed in an amount of from 40 to 20 parts by weight.

12. A concrete topping composition comprising the reaction product of (A) from 65 to 80 parts by weight of an epoxy resin of a polyhydric phenol and a polyfunctional halohydrin having an epoxy equivalent weight of from 170 to 400 and (B) from 35 to 20 parts by weight of a fluid resin of (a) an epoxidized compound having an oxirane oxygen content of from 1.0 to 3.0%, said epoxidized compound being selected from the group consisting of the epoxidized higher fatty acids and the alkyl esters thereof, the alkyl group having from 1 to 5 carbon atoms and (b) a polyamine having the formula $$H_2N(RNH)_xH$$

where R is an alkylene radical having from 1 to 4 carbon atoms and $x$ is an integer from 2 to 5 said polyamine being employed in an amount of from 2.5 to 5.5 amine equivalents per total functional equivalent of said epoxidized compound, and a filler.

13. A concrete topping composition as defined in claim 12 in which said fluid resin has an amine number of from 300 to 700 and a Brookfield viscosity of from 5 to 40 poises at 25° C.

14. A concrete topping composition as defined as claim 12 in which said filler is employed in an amount of from 400 to 600 parts by weight.

References Cited in the file of this patent

UNITED STATES PATENTS

| | | |
|---|---|---|
| 2,682,514 | Newey | June 29, 1954 |
| 2,890,184 | Foerster | June 9, 1959 |
| 2,890,228 | Foerster | June 9, 1959 |
| 2,918,438 | Phillips et al. | Dec. 22, 1959 |
| 2,939,853 | Delius | June 7, 1960 |

FOREIGN PATENTS

| | | |
|---|---|---|
| 737,697 | Great Britain | Sept. 28, 1955 |
| 810,348 | Great Britain | Mar. 11, 1959 |
| 816,986 | Great Britain | July 22, 1959 |
| 1,041,246 | Germany | Oct. 16, 1958 |